(12) United States Patent
Mullen et al.

(10) Patent No.: US 6,967,053 B1
(45) Date of Patent: Nov. 22, 2005

(54) DURABLE, OPEN-FACED RETROREFLECTIVE PRISMATIC CONSTRUCTION

(75) Inventors: Patrick W. Mullen, Winsted, CT (US); Gus Bernard, West Hartford, CT (US); Robert B. Nilsen, Weatogue, CT (US)

(73) Assignee: Reflexite Corporation, Avon, CT (US)

( * ) Notice: Subject to any disclaimer, the term of this patent is extended or adjusted under 35 U.S.C. 154(b) by 0 days.

(21) Appl. No.: 09/488,129

(22) Filed: Jan. 20, 2000

Related U.S. Application Data

(60) Provisional application No. 60/116,543, filed on Jan. 21, 1999.

(51) Int. Cl.[7] .............................. B32B 3/00; G02B 5/122
(52) U.S. Cl. ....................... 428/156; 428/161; 428/163; 428/164; 359/529; 359/530
(58) Field of Search ................................ 359/529, 530; 428/141, 142, 143, 144, 148, 156, 161, 163, 428/164

(56) References Cited

U.S. PATENT DOCUMENTS

| | | | |
|---|---|---|---|
| 2,310,790 A | 2/1943 | Jungersen | 88/105 |
| 2,380,447 A | 7/1945 | Jungersen | 88/78 |
| 3,140,340 A * | 7/1964 | Weber | 359/514 |
| 3,689,346 A | 9/1972 | Rowland | 156/242 |
| 3,782,805 A | 1/1974 | Brown | 350/129 |
| 3,846,012 A | 11/1974 | Brown | 350/128 |
| 3,938,876 A | 2/1976 | Brown | 350/128 |
| 3,966,301 A | 6/1976 | Brown | 350/128 |
| 4,004,930 A * | 1/1977 | Tung | 106/31.04 |
| 4,012,115 A | 3/1977 | Brown | 350/128 |
| 4,025,159 A * | 5/1977 | McGrath | 359/514 |
| 4,100,625 A * | 7/1978 | Tung | 359/516 |
| 4,127,693 A | 11/1978 | Lemelson | 428/163 |
| 4,208,090 A | 6/1980 | Heenan | 350/61 |
| 4,618,518 A * | 10/1986 | Pricone et al. | 359/530 |
| 4,712,867 A * | 12/1987 | Malek | 359/539 |
| 4,981,904 A | 1/1991 | Fischer | 524/601 |
| 5,182,663 A * | 1/1993 | Jones | 349/113 |
| 5,272,562 A * | 12/1993 | Coderre | 359/529 |
| 5,335,111 A | 8/1994 | Bleier | 359/529 |
| 5,361,171 A | 11/1994 | Bleier | 359/855 |
| 5,376,431 A | 12/1994 | Rowland | 428/164 |
| 5,589,991 A | 12/1996 | Bleier | 359/856 |
| 5,642,222 A | 6/1997 | Phillips | 359/530 |
| 5,657,162 A * | 8/1997 | Nilsen et al. | 359/530 |
| 5,780,140 A | 7/1998 | Nilsen | 428/172 |
| 5,786,066 A * | 7/1998 | Martin et al. | 428/172 |
| 5,805,339 A * | 9/1998 | Martin et al. | 156/230 |

(Continued)

FOREIGN PATENT DOCUMENTS

EP 0525 708 A1 2/1993

(Continued)

OTHER PUBLICATIONS

PLX, Inc., "Hard-Mounted Hollow Retroreflector," accessed Dec. 16, 1999 (available from www.plxinc.com/hmhrfrnt.html).

(Continued)

Primary Examiner—Alicia Chevalier
(74) Attorney, Agent, or Firm—Hamilton, Brook, Smith & Reynolds, P.C.

(57) ABSTRACT

Retroreflective sheeting and a method for making the same includes a plurality of open-faced cube-corner surfaces formed from a substantially rigid material to keep the cube-corner surfaces from flexing. An optical coating is formed on the surfaces, and a fill layer is attached to at least a portion of the optical coating. A plurality of voids form the open-faced cube-corner surfaces.

27 Claims, 12 Drawing Sheets

U.S. PATENT DOCUMENTS

| | | | |
|---|---|---|---|
| 5,835,271 A * | 11/1998 | Stump et al. | 359/529 |
| 5,976,446 A | 11/1999 | Lin et al. | 264/328.14 |
| 6,050,691 A * | 4/2000 | Fellows et al. | 359/529 |
| 6,142,643 A * | 11/2000 | Araki et al. | 313/498 |
| 6,280,822 B1 * | 8/2001 | Smith et al. | 428/161 |
| 6,287,670 B1 * | 9/2001 | Benson et al. | 428/172 |

FOREIGN PATENT DOCUMENTS

| | | |
|---|---|---|
| WO | WO 98/20375 | 5/1998 |
| WO | WO 98/53645 | 11/1998 |
| WO | WO 99/31534 | 6/1999 |
| WO | WO 00/42453 | 7/2000 |
| WO | WO 00/42454 | 7/2000 |

OTHER PUBLICATIONS

PLX, Inc., "Hollow Retroreflector Arrays for Modern FTIR Long-Path Spectroscopy," accessed Dec. 16, 1999 (available from www.plxinc.com/hrafrnt.html).

* cited by examiner

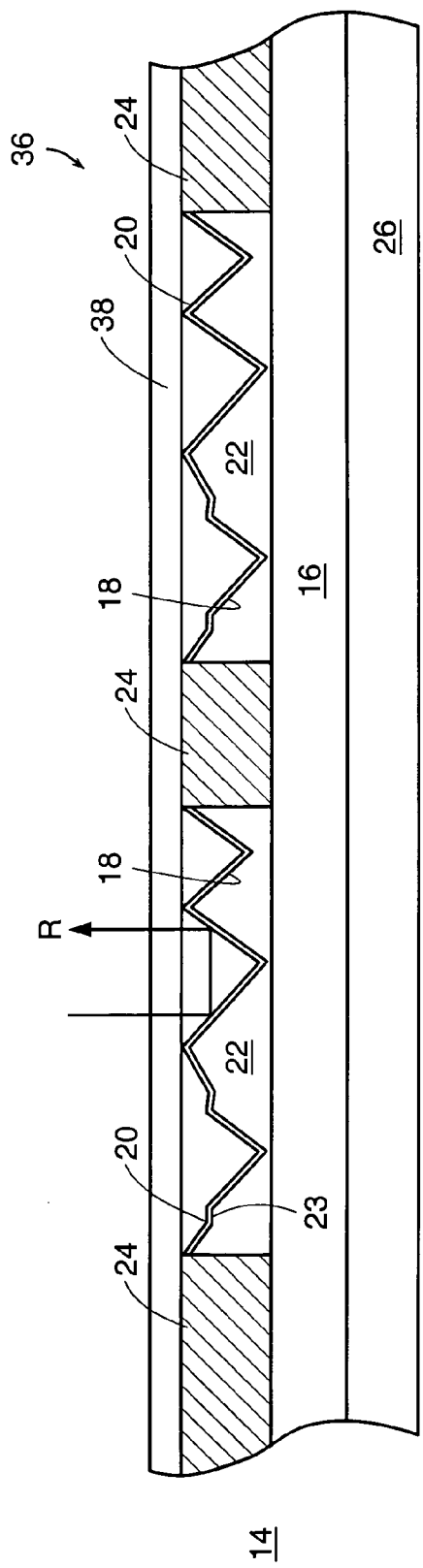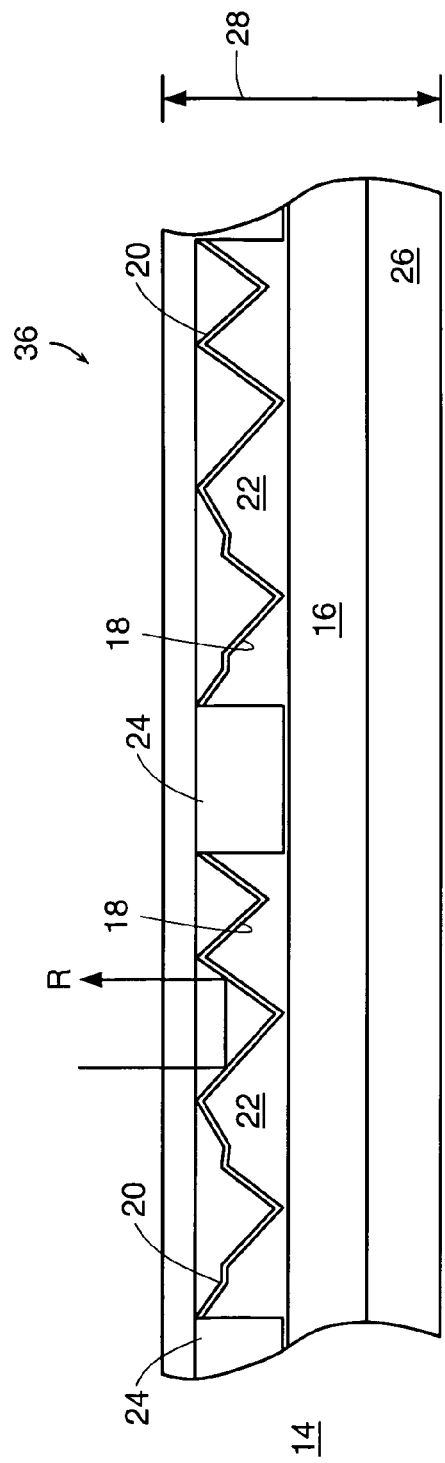
FIG. 3
FIG. 4

DURABLE, OPEN-FACED RETROREFLECTIVE PRISMATIC CONSTRUCTION

RELATED APPLICATION

This application claims priority to U.S. Application No. 60/116,543, filed Jan. 21, 1999, the entire teachings of which are incorporated herein by reference.

BACKGROUND OF THE INVENTION

Traditional retroreflective sheeting materials, such as those disclosed in U.S. Pat. Nos. 3,689,346, 3,712,706, and 3,810,804, the teachings of which are incorporated herein by reference, are described as cube-corner structures that are molded from tooling that comprises of a plurality of element forming cavities (odd generation tooling) which produce cube-corner segments having substantially planar front major surfaces.

Traditional cube-corner prisms have a base with three surfaces intercepting at an apex. As shown in FIG. 1, the prisms are oriented such that the light ray R enters through the base 10 and is retroreflected by the three surfaces 12. This requires that the prisms be formed from a material which allows a significant amount of the light rays to pass therethrough. Thus, the prism material is limited to materials which have this property. Unfortunately, it has been found that these materials are often susceptible to ultraviolet (UV) light, visible light, and/or thermal degradation, resulting in diminished performance capabilities.

SUMMARY OF THE INVENTION

Retroreflective sheeting and a method for making the same includes a plurality of open-faced cube-corner surfaces formed from a substantially rigid material to keep the cube-corner surfaces from flexing. An optical coating is formed on the surfaces and a fill layer is attached to at least a portion of the optical coating. Preferably, a plurality of voids form the open-faced cube-corner surfaces, wherein each void includes three surfaces which meet at a nadir.

In one embodiment, at least some of the surface has a color coating thereon. Preferably, the fill layer is substantially transparent, such as a material with an index of refraction in the range of between about 1.5 and 1.65. A top coat can be formed over the fill layer to protect the same.

In one embodiment, the substantially rigid material is selected from a group consisting of thermoplastic and thermoset polymers. The rigid material can further include fillers, such as glass, graphite, high temperature fibers, and glass-filled composites. In one embodiment, the optical coating includes a specular coating. In another embodiment, the optical coating includes a low index of refraction dielectric material, preferably having an index of refraction in the range between about 1.1. and 1.3.

Preferably, the open-faced cube-corner surfaces are formed on a carrier substrate. A second layer of open-faced cube-corner surfaces can be formed on a back side of the carrier substrate such that a first layer of retroreflective open-faced cube-corner surfaces and the second layer of cube-corner surfaces are back to back with the respective open-faced surfaces facing away from each other.

The open-faced retroreflective sheeting can be cut or formed into flakes or chips which can be mixed with various coatings or resins. The sheeting can also include patterns or gaps having no open-faced cube-corner surfaces. In this embodiment, walls can be formed in the retroreflective sheeting that extend from the carrier substrate to a prism ridge. In one embodiment, the thickness of the walls is in the range of between about 25.4 and 1,270 microns (0.001 and 0.05 inches).

Retroreflective sheeting is also provided which includes a plurality of three-sided indentations which form open-faced cube-corners. A reflective coating is formed on the three-sided indentations and a fill layer attached to the reflective coating.

A method is further provided to form open-faced retroreflective sheeting which can include the step of forming a mold by forming three sets of grooves. Preferably, the grooves intersect at an angle to form a plurality of prisms and each prism has a base and three intersecting lateral faces which meet at an apex. The method further includes the step of forming the retroreflective sheeting on the mold to form a mirror image of the mold wherein the resulting sheeting includes a plurality of three-sided indentations which form cube-corner surfaces. The cube-corner surfaces are preferably coated with a specular coating with a fill layer attached thereto.

The invention provides for an air-filled prismatic product which can be protected on the front by a long-life, clear film. The microstructure can be formed from polymeric epoxies, acrylics or the like, depending on the product performance needs. Preferably, the material is selected from a group of materials that is resistant to UV light, visible light, and/or thermal degradation.

Many variations on these types of open-faced structures and back to back open-faced structures include:

1. The open structures can be filled with clear or colored resins to improve the entrance angle, change the color, reduce curling, increase adhesion to the cover film, etc.
2. "Chips" or small segments of the open structures and back to back open-faced structures can be encapsulated between two outer films, such as acrylic films, or added into transparent coatings, transparent printing compositions, transparent thermoplastics and transparent thermoset resins, transparent adhesives, transparent binders, etc.
3. The metalized face can be left uncovered for applications that may involve short-life use or require reflection of short wavelength UV light.
4. A sealable backside film (e.g., urethane or acrylic) can be sealed into a durable face film (e.g., mylar or acrylic) such as done with sealed bead retroreflective products.
5. Filling the open prisms can be done by spray coating (electrostatic or otherwise), gravure coating, a hot-nip process at normal room pressure or in a vacuum chamber if air entrapment is a problem, roller coating, or similar methods known to those skilled in the art.
6. Combinations of open-faced prism sizes (pitches) and closed-faced prism structures or a microlens face film can be used to change entrance/observation angle properties and color properties.
7. Tooling for open-faced prism structures can be formed with spaces or gaps to create open-faced prism islands on carrier films. The carrier film and open-faced prisms fill material can be flexible or rigid or elastic to suit the application.
8. Low refractive index coatings may be used in place of the metalized coating to provide high whiteness open-faced structures or chips that can be mixed into high refractive index binders.
9. Other technologies that are used to control the behavior of traditional cube-corner structures can be employed to an advantage with the open-faced product.

BRIEF DESCRIPTION OF THE DRAWINGS

FIG. 3 is a side view of an embodiment of open-faced retroreflective sheeting in accordance with the present invention.

FIG. 4 is a side view of another embodiment of open-faced retroreflective sheeting in accordance with the present invention.

Figure 1:
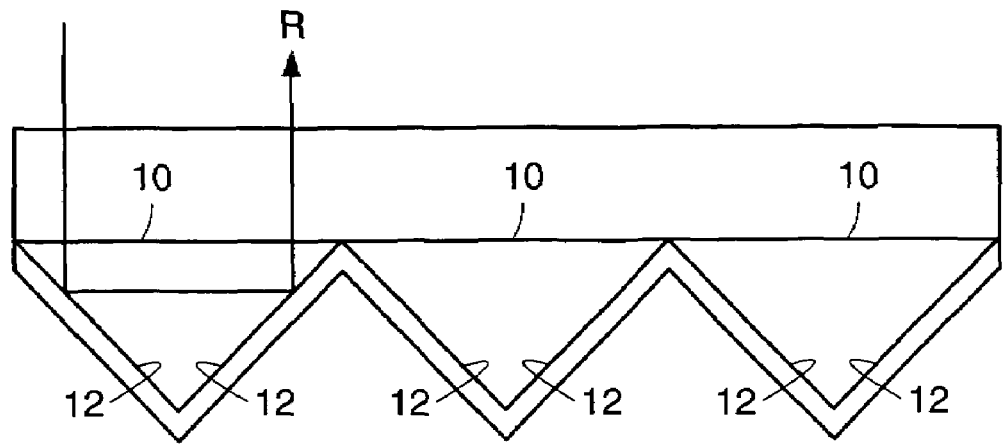
FIG. 1 is a side view of cube-corner prisms in accordance with the prior art.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. All parts and percentages are by weight unless otherwise indicated.

DETAILED DESCRIPTION OF THE INVENTION

Figure 2:
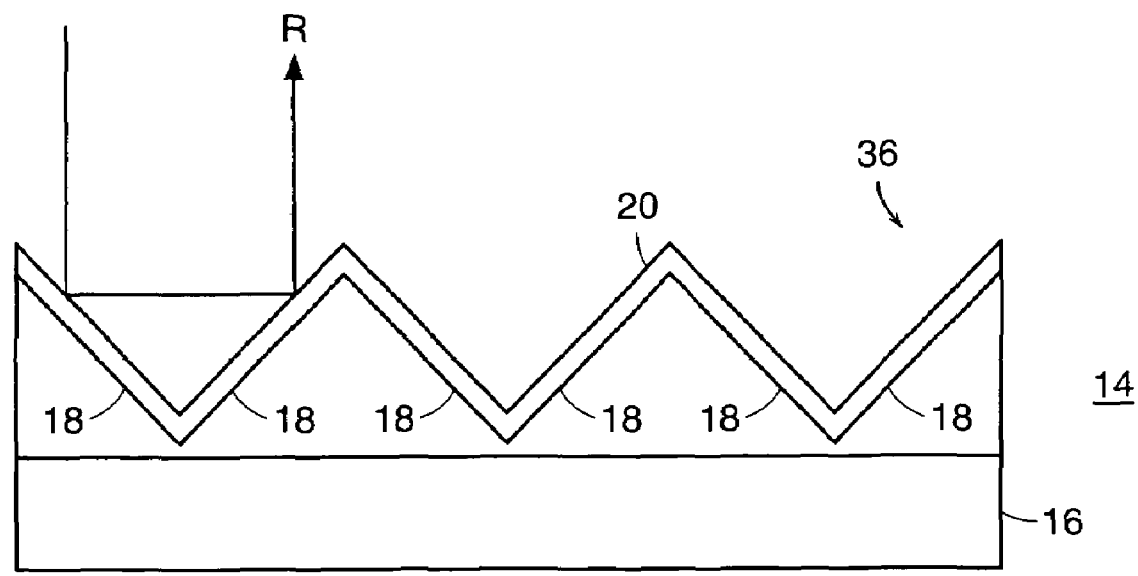
FIG. 2 is a side view of open-faced retroreflective sheeting in accordance with the present invention.

A description of preferred embodiments of the invention follows. FIGS. 2–4 illustrate retroreflective sheeting that has been constructed in accordance with principles of the present invention. Generally, a bottom carrier sheet or substrate 16, such as a sheet or film, supports open-faced surfaces 18. The bottom carrier substrate 16 can be formed of a variety of materials that are transparent or non-transparent. Preferably, a specular, optical, or reflective coating 20, such as aluminum, is formed on the surfaces 18. Preferably, optical coating 20 is permanently attached, i.e., not easily removable, to the surfaces 18. The surfaces 18 are aligned with respect to one another to retroreflect an incoming light ray R substantially parallel to its incoming entrance angle. In one embodiment, the surfaces are linear with one surface being disposed at substantially 90 degrees to the next surface. Preferably, surfaces 18 comprise open-faced "cube-corner" surfaces, which are three surfaces disposed at substantially 90 degrees to one another, similar to traditional cube-corner prisms. The nadir of the surfaces 18 are spaced preferably with a pitch in the range of between about 25.4 and 508 $\mu$m (0.001 and 0.020 inches). Preferably, the incoming light ray R internally reflects off of the three surfaces such that the outgoing light R is substantially parallel to the incoming light ray R, regardless of the entrance angle.

In the embodiments of FIGS. 3 and 4, islands of prisms 22 provide the cube-corner surfaces 18. In some embodiments, a portion 23 of the prism surfaces can be non-cube corner to provide some scatter of light for aesthetic appearance. A plurality of gaps or voids 24 having no prisms may be provided for purposes such as providing flexibility to the sheeting 14, modifying the behavior of, or to improve the aesthetics of the sheeting 14, or to provide markings therein, such as a company logo. In one embodiment, the width of voids 24 is in the range of about 50.8 and 1,270 $\mu$m (0.002 and 0.050 inches). An adhesive layer 26 can be provided on the bottom carrier sheet 16. In one embodiment, the retroreflective sheeting 14 has a thickness 28 of less than 0.01016 centimeters (0.004 inches).

In typical manufacture of retroreflective material, an odd generation tooling is utilized to cast solid corner cube prisms onto a substrate that then becomes the top film. This invention includes a retroreflective sheeting and method of manufacture of the material which is molded from a grooved structure which has been cut or replicated to describe the back-side of a traditional cube-corner array (even generation tooling), and the product has a substantially planar rear surface. If the sheeting is formed from a material such as a metal, the product retroreflects from its front surface. However, if it is formed from commonly available polymers, such as a highly reflective coating such as vacuum deposited aluminum, provides for a retroreflective interface. Such a reflective metallic material has optical constants which result in high reflectivity in the visible wavelength region. Examples of materials having a suitable optical constant are aluminum, chromium, copper, zinc, gold, silver, platinum, nickel, or the like.

Figure 5:
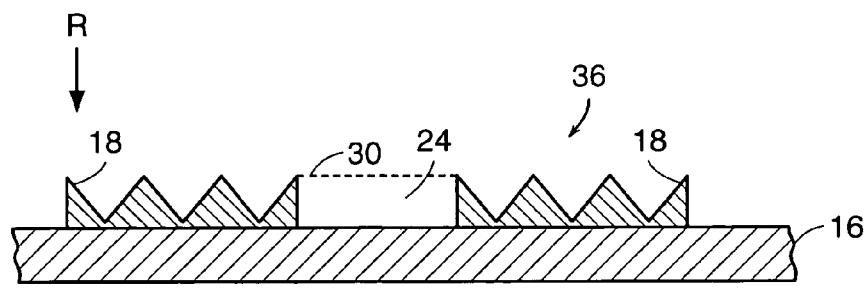
FIG. 5 illustrates a step of forming open-faced retroreflective sheeting which includes forming open-faced cube-corner surfaces on a carrier sheet.

FIGS. 5, 6, 7, and 8 are side views of a method for forming the retroreflective structure 14 at various points in forming an embodiment of the present invention. In the present process, even generation tooling is employed to cast the open face prism islands 22 onto a carrier film 16, as shown in FIG. 5. Preferably, the prism islands 22 are continuously formed on the bottom carrier sheet 16.

Upon removing from the mold, the bottom carrier sheet 16 becomes the bottom film. In one embodiment, the gaps 24 are formed between prism islands 22. In an alternative embodiment, the gaps 24 are filled with prism material as represented by dashed-line 30.

In an alternate embodiment, the open-faced prism surfaces 18 can be coated with a low refractive index material and filled with a high refractive index material to create a high whiteness retroreflective product. Alternatively, the open-faced prisms can be formed with a low index of refraction resin and then filled, without metalizing, with a high index resin to also create a high whiteness retroreflective product.

Figure 6:
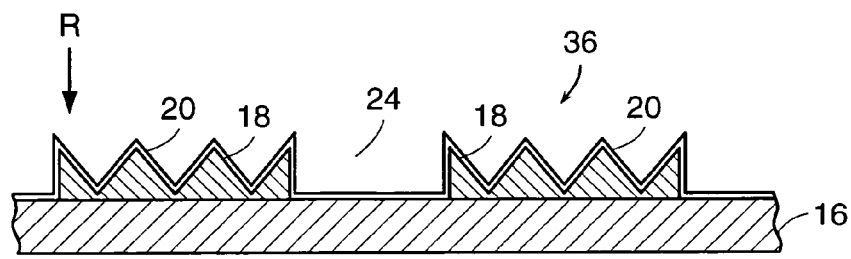
FIG. 6 is similar to FIG. 5 and illustrates the step of metalizing the cube-corner surfaces.
Figure 7:
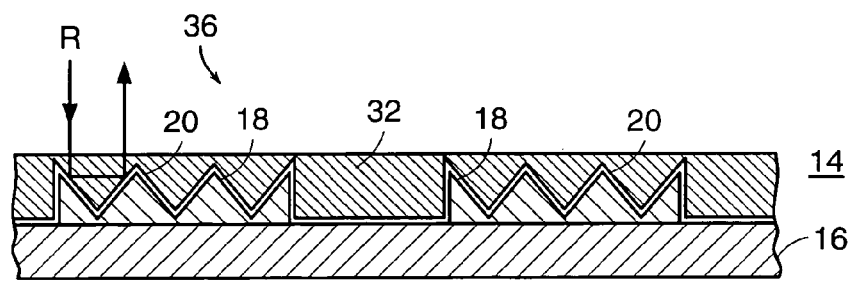
FIG. 7 is similar to FIG. 6 and illustrates the step of forming a fill coat over the metalized layer.

The cube-corner surfaces 18 are covered with an optical coating 20, such as a metal layer that includes aluminum, silver or other suitable specular metal, as shown in FIG. 6. In one embodiment, a low index transparent perfluorinated polymer, which has an index of refraction of about 1.1, can be used as an optical coating to coat the surfaces 18. The open-faced prisms can be filled with a fill coat 32, such as a colored or substantially clear/transparent long weathering polymer, as shown in FIG. 7. The fill coat 32 can be permanently attached to the specular metal. The polymer can be flexible and/or elastomeric. It is not required that the fill coat 32 provide any strength to the sheeting 14 as such is provided by the rigid material forming the prism islands 22 to maintain a dihedral angle of ninety degrees of the open-faced prisms. This allows for the use of materials that are not structurally strong enough for conventional cube-corner prisms, but have other physical properties that are advantageous for retroreflective sheeting, such as increased ultraviolet light stability, etc. Examples of fill materials include simple acrylic or acrylic-fluorocarbon polymers. It is preferable that fill coat 32 be substantially resistant to UV degradation. In one embodiment, the fill coat 32 comprises a material having an application viscosity of less than or equal to about 1,000 centipoises. Such materials can also have a low glass transition temperature, such as fluorocarbon, fluorinated acrylic, or fluorinated urethane. An example of a suitable low glass transition temperature range is between about −20 and 80 degrees Celsius (−4 and 176 degrees Fahrenheit). Preferably, the glass transition temperature is less than about 15 degrees Celsius (59 degrees Fahrenheit). It is noted that the fill coat 32 increases the entrance angle at which light rays R enter and therefore can be retroreflected by cube-corner surfaces 18. Fill coat 32 can be designed to be wavy (non-planar) to improve angular retroreflective performance.

Figure 9:
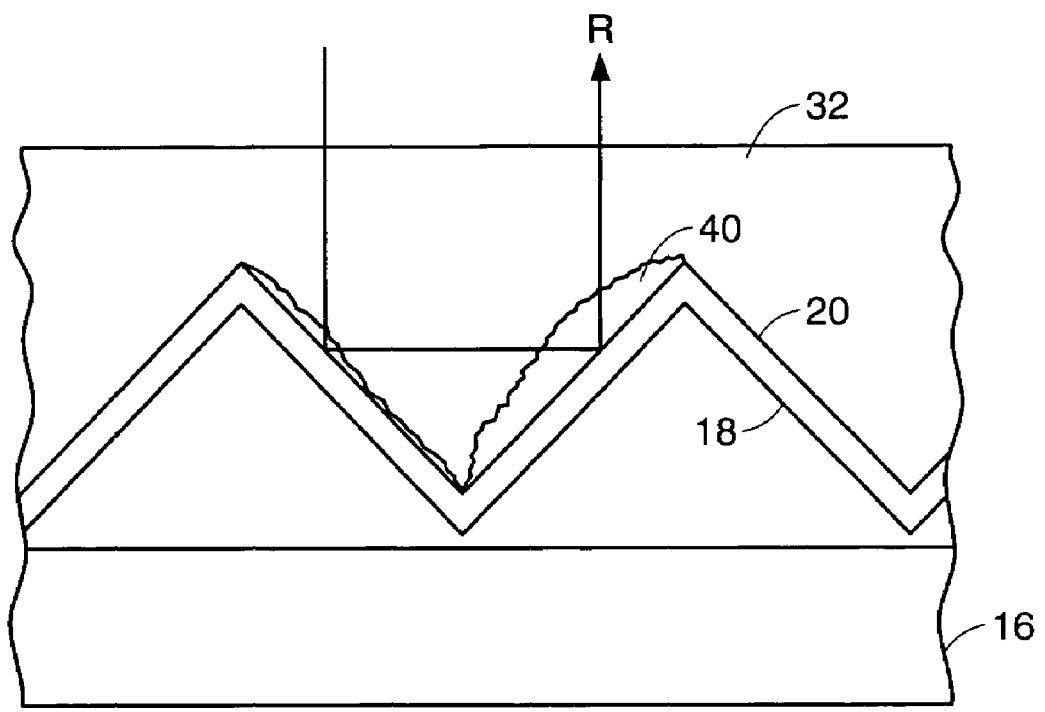
FIG. 9 is a side view of open-faced retroreflective sheeting illustrating an undesirable air pocket.

As shown in FIG. 9, it is important that air pockets 40 are minimized or preferably avoided as these air pockets change the path of the light ray R such that it is not parallel to the incoming light ray. Alternatively, there can be some instances where air pockets 40 provide beneficial spreading of the retroreflected light. Also, for some applications, it is beneficial to have the top surface of fill coat 32 wavy to assist in spreading of light.

Figure 8:
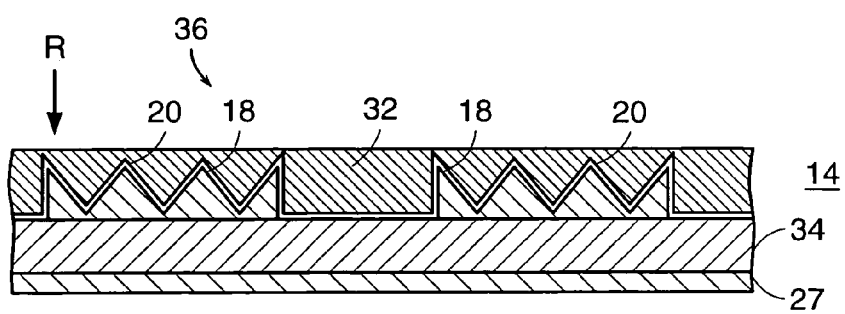
FIG. 8 is similar to FIG. 7 and illustrates the step of attaching an adhesive and a release layer to the prisms.

The carrier film 16 can be removed and an opaque white or colored adhesive 34 with a release liner 27 applied in place of the carrier film, as shown in FIG. 8. The white color of the adhesive is visible through the transparent fill layer 32.

A primary advantage of this new type of sheeting is that it can be formed from materials which can have superior properties in areas, such as heat resistance, non-flammability, dimensional stability, environmental durability, chemical resistance etc., without the requirement that the material be transparent as in the traditional construction. Additionally, when the open-faced structure is formed of environmentally fragile polymers, the metal face coating can serve to protect them from destruction by ultraviolet light, moisture, oxygen, etc. Examples of such materials include acrylic polymers, polycarbonate, silicone, metallic acrylate, and diacrylate.

The material can be formed on molds which have additional protrusions built into them which are structured as lines or shapes which provide for the void areas 24 in the sheeting 14. The void areas 24 can serve to improve product flexibility, enhance aesthetics or provide for a means of identification. The protrusions can also be designed to assist in the control of the thickness of the sheeting as it is being formed in production by providing for walls that prevent lower viscosity prepolymers from flowing off a mold during the production process.

Additional transparent or partially transparent coatings can be applied to the front side 36 of the sheeting 14 in order to change the product color, improve the smoothness, abrasions resistance or the other reasons that those in the industry commonly coat their products. These coatings may also serve to control the entrance/observation angle responses of the material because their refractive indices are normally higher than air. The thickness of the sheeting 14 as it is being formed in production can be controlled by providing for walls that prevent lower viscosity prepolymers from flowing off a mold during the production process. In the embodiments where the bottom carrier sheet 16 has a matte or irregular surface, the void areas 24 serve to increase the visual whiteness (cap Y) of the structure after a metal coating is applied to it. It is often desirable to increase the whiteness of a metalized product for daytime visibility or aesthetic reasons. This invention can also be practiced with a white or other colored polymer structure, and the metalizing conditions can be controlled to leave unmetalized areas, such as the walls of the void areas, which tend to increase the cap Y or provide for a unique color appearance of the sheeting. The color of walls reflects off of the reflective void area 24.

The cube-corner surface 18 can include windows or steps to increase daytime Cap Y and color as taught in International Publication No. WO 98/59266, published Dec. 30, 1998 and which corresponds with U.S. application Ser. No. 08/883,329, filed Jun. 25, 1997 and issued as U.S. Pat. No. 6,258,443, the contents of which are incorporated herein by reference.

Additional coatings can be applied to the front side of the sheeting in order to change the product color, improve the smoothness, abrasion resistance, product color light stability, or the other reasons that those in the industry commonly coat their products. These coatings can also serve to control the entrance/observation angle responses of the material because their refractive indices are normally higher than air. To create areas of differing reflectivity angle behavior, for example, a clear print pattern can be used to fill in areas of the open-faced structure and then a clear cover film is applied to the front of the sheet. The clear printed areas retroreflect at angles that are significantly larger than the area that has an air layer at its face and can be used to reflect a different message to the viewer at narrow observation angles than to the viewer at the wide viewing angle. There are useful applications here for a security film product.

A top carrier sheet 38 can also be adhered to the front side of the structure for purposes of convenience, color or protection, as shown in FIG. 3. It can also serve as a carrier for the elements if the back side carrier 16 is removed in order to fill in the void areas with decorative or functional materials, such as a colored adhesive. If the top carrier sheet 38 has a conductive surface characteristic and the air cavities are filled with an electrooptic active composition, such as liquid crystal, one can utilize this construction to form a display device or tunable reflector. In one embodiment, the top carrier sheet 38 is conductive for allowing an electrical charge to pass between the top carrier sheet and the optical coating 20. Preferably, the top carrier sheet 38 includes a transistor pattern. In another embodiment, the top carrier sheet 38 is conductive and the bottom carrier sheet 16 is also conductive for allowing an electrical charge to pass between the top carrier sheet and the bottom carrier sheet.

Figure 10:
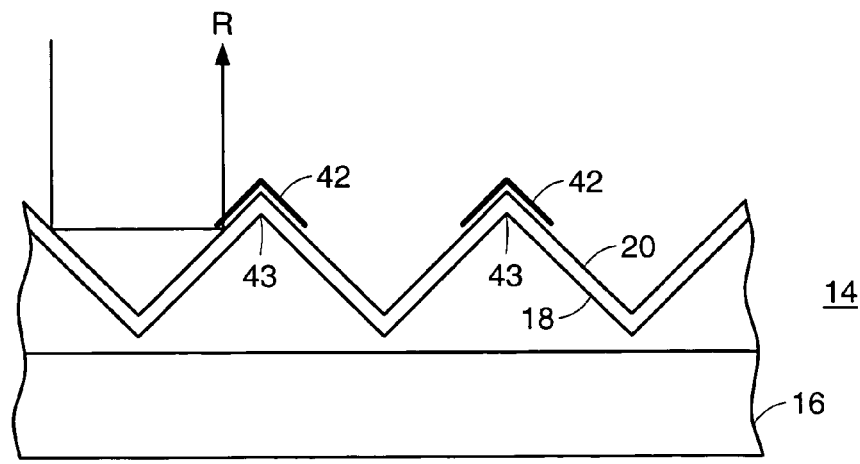
FIG. 10 is a side view of open-faced retroreflective sheeting illustrating colored prism ridges which create different size open-faced prisms.
Figure 11:
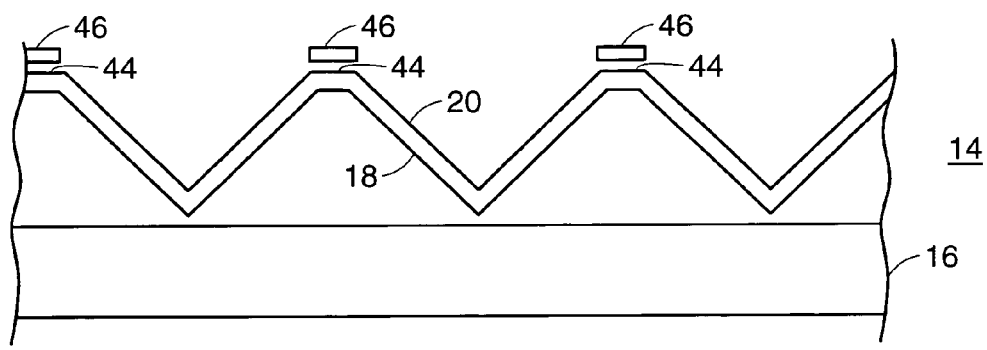
FIG. 11 is a side view of open-faced retroreflective sheeting illustrating colored flats between individual open-faced prisms.
Figure 12:
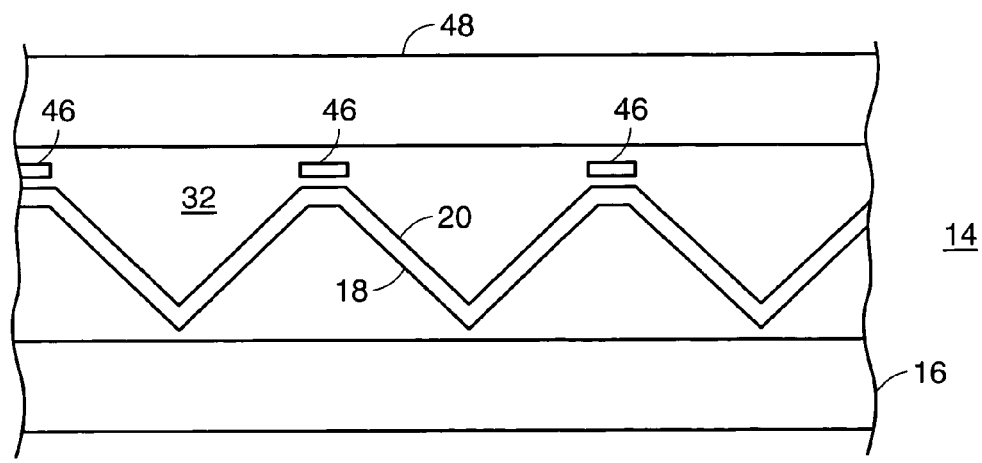
FIG. 12 is similar to FIG. 11 and illustrates a fill coat attached to the cube-corner surfaces and a top coat formed on the fill coat.

In the embodiment of FIG. 10, the ridges 43 of certain open-faced prisms have a color coating 42 thereon to create different size prisms, to improve retroreflective performance, and for aesthetic purposes. Colored coated ridges can be formed by printing colors, colored adhesive and can also be in patterns. In the embodiments of FIGS. 11 and 12, flats 44 are provided on each prism with a color coating 46 on each flat. A fill coat 32 can then be formed on the structure with an optional top coat 48 completing the retroreflective structure 14. In FIGS. 10, 11, and 12, the color may be applied as a printed pattern.

Figure 13:
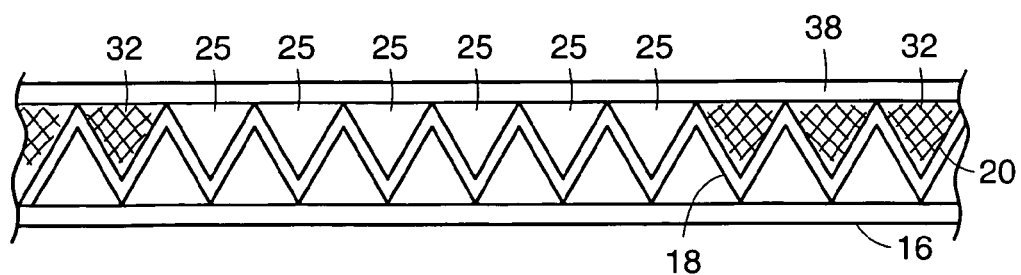
FIG. 13 is a side view of open-faced retroreflective sheeting having a patterned fill layer formed thereon.

FIG. 13 illustrates retroreflective sheeting 10 having prism surfaces 18 covered with an optical coating 20. In this embodiment, the fill layer 32 covers certain portions of the surfaces 18 leaving areas 25 of prisms having no fill layer. A top film 38 protects the open-faced prisms from deleterious environmental conditions, such as dirt.

The following process can be used to manufacture unique ambient light appearance reflective and retroreflective products such as projected light front projection screens for use with LCD, digital micro-mirror device (DMD), front projection systems, etc.

1) Provide a retroreflective corner cube mold.
2) Cast open-faced corner cubes onto both sides of a thin polyester film. The corner cubes may vary in size and texture for each casting run to achieve the variation in light distribution desired for the final product.
3) Metalize the reflecting textured facets of the corner cubes with a specular coating, such as aluminum or silver. Facets do not require texture for retroreflective front projection and imaging screens.
4) Print a colored coating onto the metalized surface. A single color or a multiple color pattern can be used depending on the ambient color effect desired in the final product.
5) Fill the open-faced corner cubes on one or both sides of the film with a material that creates air gaps in the open-faced prisms.
6) Dice the retroreflective sheeting into approximately 0.0508 centimeter (0.020 inch) square pieces.
7) Mix the diced pieces into a clear plastisol.
8) Spread the plastisol onto a backing film, such as a white polyvinyl chloride. Spreading can be done with one color diced batch, a multiple color-mixed diced batch or with individual color diced batches spread in specific patterns to create an art object which also serves as a front projection screen. The diced pieces orient approximately 50% up and 50% down with some overlapping and tipped pieces. The up pieces can give excellent projected light reflection and the down pieces can give excellent ambient light color.
9) Cure the plastisol to form a one piece vinyl sheet.
10) Mount the finished sheet to form a front projection screen.

The finished projection screen has excellent ambient light appearance and superb light reflection characteristics. The reflected and retroreflected light is greater than the present front projection screens in the market today and the reflected image has improved contrast without scintillation effects. This improvement makes it much easier to produce an affordable LCD or DMD light engine projection system for consumer use. The front projection screen can be made to any size desirable without creating objectionable seams. One form of projection or imaging screen is made without textured facets or other light spreading means specifically for retroreflecting screens, such as those used in three dimensional imaging systems.

Figure 14:
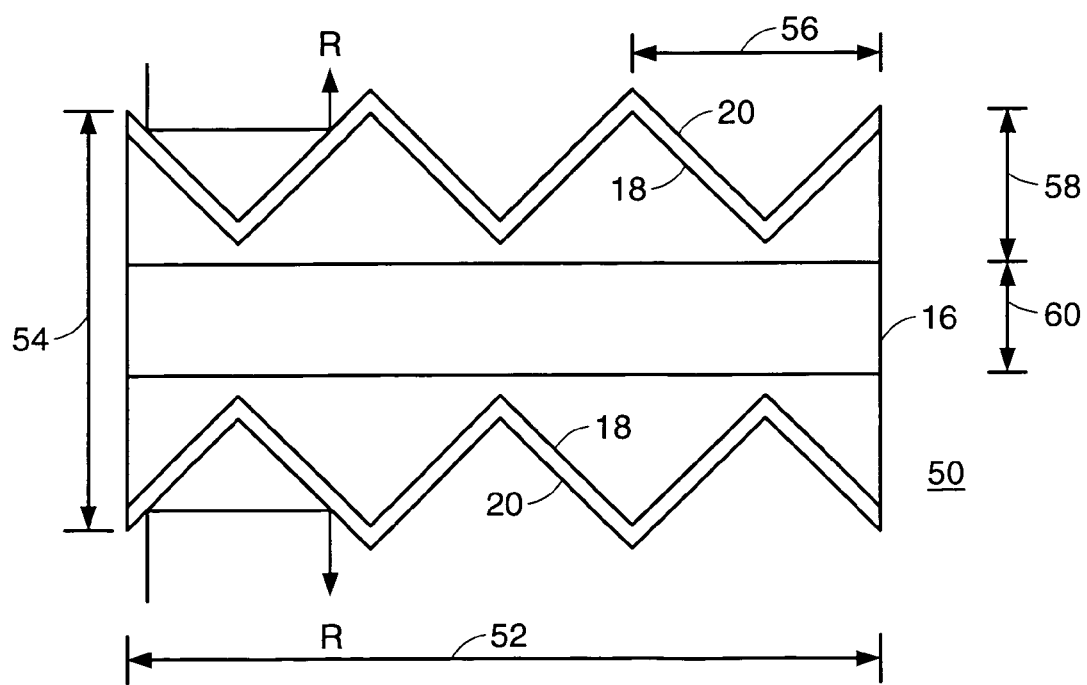
FIG. 14 is a side view of a double sided open-faced retroreflective sheeting having open-faced prisms formed on both sides of the carrier sheet.

The open-faced prisms can be formed initially on one side of the thin-film or bottom carrier sheet 16. In an optional second step, as illustrated in FIG. 14, open-faced prisms are formed on the opposite side or back of the carrier sheet 16. Both open-faced prism sides of the film are metalized 20 with aluminum, silver or other type of reflective coating. The open-faced prisms work well in the diced application if they are made of small retroreflective cube-corner structures. The very small structures or prisms can be diced into small chips without damaging a high percentage of the retroreflective area of the prisms.

In one embodiment, the open-faced cube-corner retroreflective sheeting is formed on the back side of a conventional cube-corner retroreflective sheeting. The conventional cube-corner prisms can be colored as well as the fill layer 32, with the same or different color, to create optical effects that are useful for detecting with a hyperspectral sensing equipment. The resulting structure has one appearance as viewed by the naked eye, and a different signature when measured with a hyperspectral scanner. The hyperspectral scanner provides a scan of the intensity of the retroreflected wavelengths (from ultraviolet through the infrared) as compared with what is seen with the naked eye.

Transparent colors can be digitally printed into the open-faced prisms to form a visual image that has one message when viewed by the naked eye, and a different message when scanned by a hyperspectral scanner. These concepts are useful for many security applications, authentication applications and identification applications such as friend/foe and search and rescue. One example in document security is identification possible of not only the forgery, but the copier the forgery was made on because of the wavelengths that are retroreflected or not retroreflected by the various chips.

In another embodiment, the carrier material is made of a relatively thin (25.4 μm (0.001 inch)) plastic such as a cast acrylic which can easily fracture at points between the open-faced prism islands even if a double sided material. The prism islands are not necessarily in register with each side. A thin perforated or grooved carrier such as a 25.4 μm (0.002 inch) thick perforated PET can be used to achieve this result.

The open-faced construction is a significant advantage because it can be applied to both sides of the film followed by reflective coating of the prisms. When this construction is diced into chips, both sides of the chips retroreflect incoming light rays. In the embodiment of FIG. 14, the length 52 of the chip 50 can be between about 25.4 and 457.2 µm (0.001 and 0.018 inches). The width 54 can be between about 25.4 and 457.2 µm (0.001 and 0.018 inches). For the small retroreflective cube-corner structures, the distance 56 between apices can be between about 25.4 and 152.4 µm (0.001 and 0.006 inches). The height 58 of the prisms can be between about 7.62 and 71.12 µm (0.0003 and 0.0028 inches). The thickness 60 of the carrier sheet 16 can be between about 25.4 and 50.8 µm (0.001 and 0.002 inches). The chips 50 can be of any shape including hexagonal, square, circular, rectangular, etc. In alternative embodiments, the chips are preferably less than about 6.45 square centimeters (1 square inch), and more preferably less than about 1.61 square centimeters (0.5 square inch), and most preferably less than about 0.4 square centimeters (0.25 square inch). Further, the chips and sheeting can be formed with one side having open-faced cube-corner surfaces and the second side can be formed with traditional cube-corner prisms.

In one embodiment, chips 50 that were sprinkled onto an adhesive provided a uniform brightness and angular brightness at about a 0.33 degree observation angle and 30 degree entrance angle which was essentially unchanged from about a 0.2 degree observation angle and 5 degree entrance angle.

Figure 15:
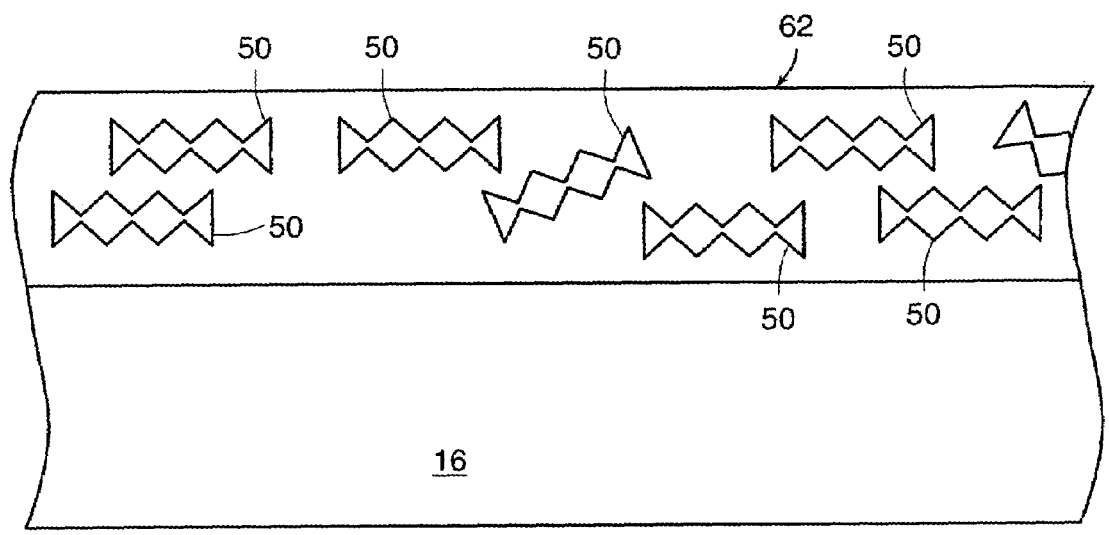
FIG. 15 is a side view of double sided open-faced retroreflective chips mixed with a coating and supported by the carrier sheet.

As illustrated in FIG. 15, when these chips 50 are mixed into coatings 62, paints, or polymers, the finished product has chips that are oriented toward the surface and all of the chips retroreflect light in a direction which is dependent on the orientation the chip arrives at during the manufacturing process. Most chips 50 orient themselves flat to a substrate 16 in the case of coatings 62 and paints. Some of the chips 50 overlap others and are tilted which results in improved entrance angle and observation angle performance. Also some chips are rotated in the plane of the flake creating improved orientation angle performance. The chips 50 can be made of a rigid polymer that does not change shape as mixed into the coating 62. The coatings 62, paints, or polymers can be rigid, flexible, or elastic, after processing.

Figure 16:
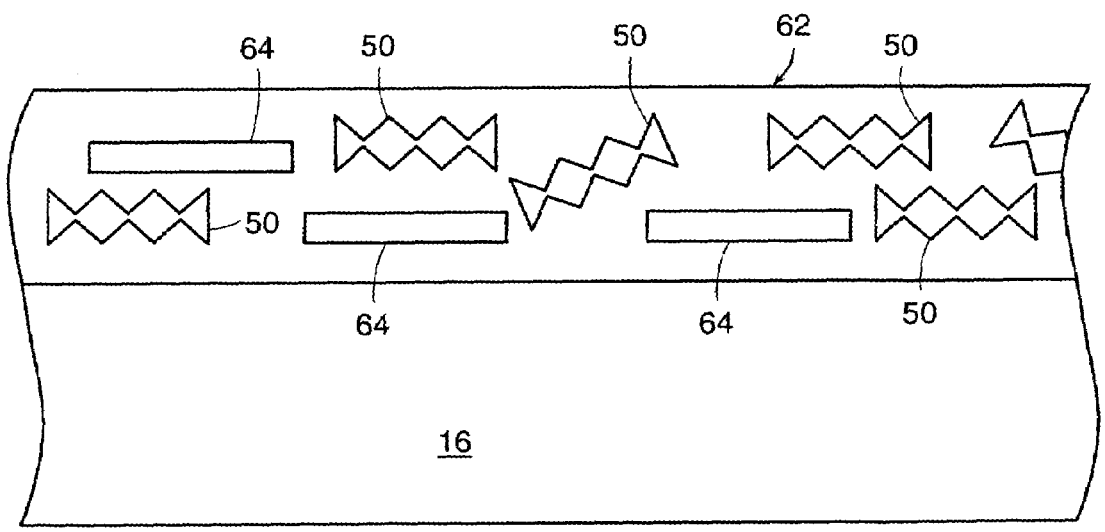
FIG. 16 is similar to FIG. 15 and illustrates colored substrates dispersed in the coating.

When the chips are aluminum metalized, they appear gray in color when viewed through a transparent material. To increase the color of the resulting material, some of the chips can be printed with a color on one side or additional chips of colored material can be mixed in with the retroreflective chips at a predetermined percentage to create the desired appearance. Also, a colored substrate or substrates 64 material may be used as illustrated in FIG. 16. This substrate 64 may be colored (for example, fluorescent, standard, opaque, transparent, etc.), diffractive, holographic, pearlescent, or reflective.

In another embodiment, the chips 50 are mixed into a transparent coating formulation which is applied to a colored substrate. Examples of transparent coating formulations include transparent inks and polymers used for retroreflective signs or back lighted signs. The coating is applied in a thickness and with a dispersion which creates the desired distribution of chips 50 across the surface of the substrate. The thickness of the coating also creates the desired surface finish which is dependent on the coating thickness and the size and thickness of the chips 50. Very wide web seamless material can be made that can be slit or cut to size to form many different types of products. The products can range from garment tape to sign blanks to imaging screens to front projection screens. In another variation, the chips 50 are mixed into a transparent polymer which is extruded or cast into a film that retroreflects and has color when viewed from both sides of the film.

Many uses for the chips include highway tape, injection molded parts, helmets, bumpers, hubcaps, car body trim, door handles, bicycle grips, back pack straps, umbrella handles, road buttons, one piece cones, barricades, channelizers, survey markers, laser alignment systems, decorative fabric and matting, molded license plates, molded signs, house numbers, mailboxes, sign sheeting, airport signs, truck bodies, fiberglass molded parts, boat trim, boat hulls, buoys, flow research, cosmetics, finger nail polish, fencing, sneakers, watch bands, dog collars, emergency exits, door markers, shipboard passageways, parking garages, railroad gates, life jackets, trail marking, etc.

In a typical application, the retroreflective film is made as described above. The film can be diced or chopped into small chips and mixed with a coating formulation or a resin formulation and then applied to a substrate or formed through a molding process. In the case of a coating, the formulation can be flooded onto a substrate and UV or heat cured followed by lamination of a film on top of the coating. The top film forms a protective sandwich for the products and can be colored and also loaded with appropriate UV blocking chemicals to protect the products from aging. The top film can also be designed with a surface which is treated to prevent the products from damage during washing or sewing.

The particle or chip size is dependent upon the application. Very small and thin particles may be desired for thin coatings. Larger surface area particles or chips may be desired for applications where the chip orientation is more important.

The coatings and resin and/or top film may be designed with coatings or dyes or pigment which selectively transmits different wavelengths of light. This product construction is especially important for applications where specialized light sources are used. Some examples of applications are air-sea rescue, object recognition and vehicle guidance.

The chips can be mixed into many different types of coatings or resins. Preferably, the temperature should be kept below the heat distortion temperature of the prisms. However, some prism resins can withstand very high temperatures and do not distort at temperatures as high as 205 degrees Celsius (400 degrees Fahrenheit). The shape of the initial tooling is used to form the open-faced prisms preferably biased so that when the prism does change shape, it changes in a direction which is beneficial. For example, applications where the chips are used to make the outer surface of fiberglass boats, a prism with standard geometry becomes about 12 minutes shallow. When the tooling is made about 12 minutes steep, the prisms in the chips end up with dihedral angles which are close to zero providing optimum performance.

Diced chips made from several different types of sheeting which each have different size cube-corner prisms can be mixed together to form an end product which has an optimized light distribution.

The chips are placed on a substrate such that an enhanced amount of light can be retroreflected. The need to have the chips all oriented and tightly packed is overcome by the way that the chips orient themselves in the coating or resin. Many chips form stratified layers and also tilt in a way which makes up for dense packing.

In one embodiment, the open-faced cube-corner surfaces 18 are constructed of different sizes on the chips 50. The chips 50 can be mixed into resins or coatings in different combinations for different optical effects.

Figure 17:
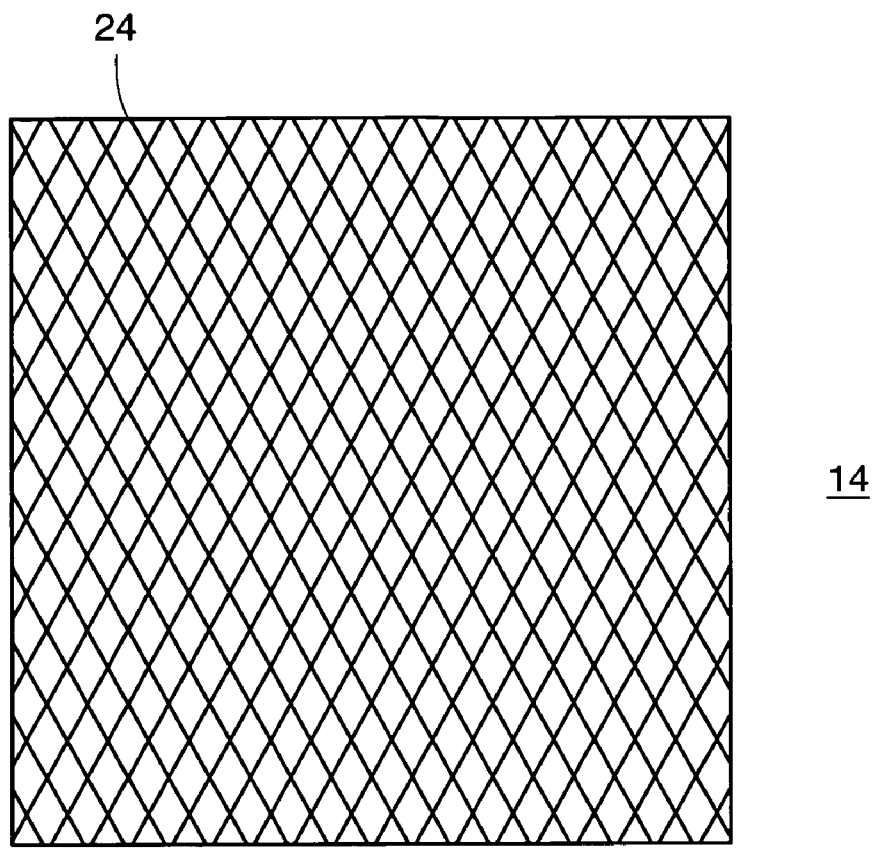
FIG. 17 is a plan view of open-faced retroreflective sheeting having a plurality of gaps formed therein.
Figure 18:
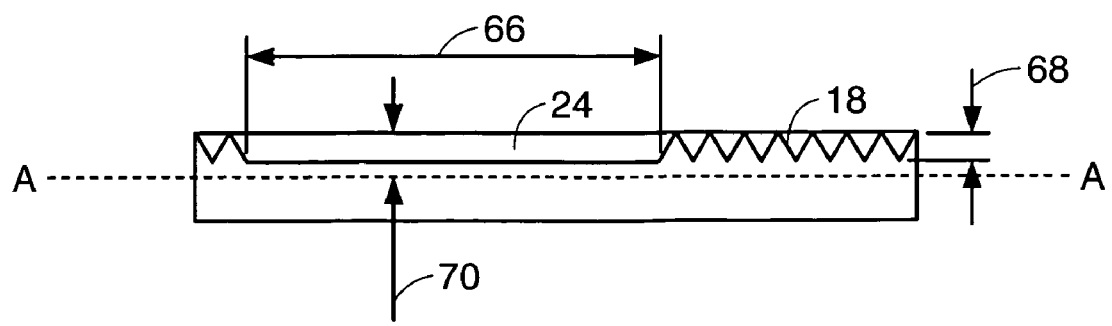
FIG. 18 is an enlarged side view of the open-faced retroreflective sheeting of FIG. 17.

In another embodiment, as illustrated in FIGS. 17 and 18, the void areas or gaps 24 are formed about 0.2286 centimeters (0.09 inches) apart, measured centerline to centerline. The gap width 66 in this embodiment is preferably less than or equal to about 508 μm (0.020 inches). The prism height 68 is about 22.94 μm (0.000903 inches). The grind depth 70 is just below the base of the prisms, preferably within 12.7 μm (0.0005 inches). The sheeting 14 is then cut into chips 50. The primary advantage of such a construction is that the center of gravity is below the axis A—A. This facilitates the proper orientation of the chip 50 (open-faced cube-corner surfaces 18 facing up) when mixed in a coating or resin.

The quantity of chips used is greater than the quantity of material used when forming a densely packed array of cube-corner but the costs of making the chips and processing the chips into substrates is lower than most of the methods used to make retroreflective materials today. One large cost benefit is the ability to make retroreflective cube-corner materials in very wide web configurations. Another cost benefit is the ability to make cube-corner chips of various configurations that can be held in inventory and mixed together appropriately to form products on demand.

In one example, retroreflective sheeting was made with 152.4 μm (0.006 inch) pitch metalized high temperature resin prisms on 50.8 μm (0.002 inch) PET. This sheeting was diced into 304.8 μm (0.012 inch) hexagonal shapes then mixed into the clear outer resin coat for a fiberglass boat hull. The resulting surface is glitter in appearance and grayish color during daytime viewing as a result of about 50% of the chips oriented with the prism apex outward. During night time viewing, the remaining chips, which are oriented to create retroreflection (cube-corner prism face outward), achieve a high degree of retroreflection uniformly across the entire surface. It was found that the temperature caused by the exothermic reaction that takes place when curing the clear outer layer of the fiber glass hull causes the prisms to become slightly shallow resulting in a donut shaped retroreflected light distribution with a divergent beam of approximately 0.762 m (2.5 ft) diameter at a distance of 15.24 m (50 ft). This shift to a shallow prism angle is corrected by using steeper tooling/molds to form the prisms so that the shift results in an optimized prism shape for the application.

Figure 19:
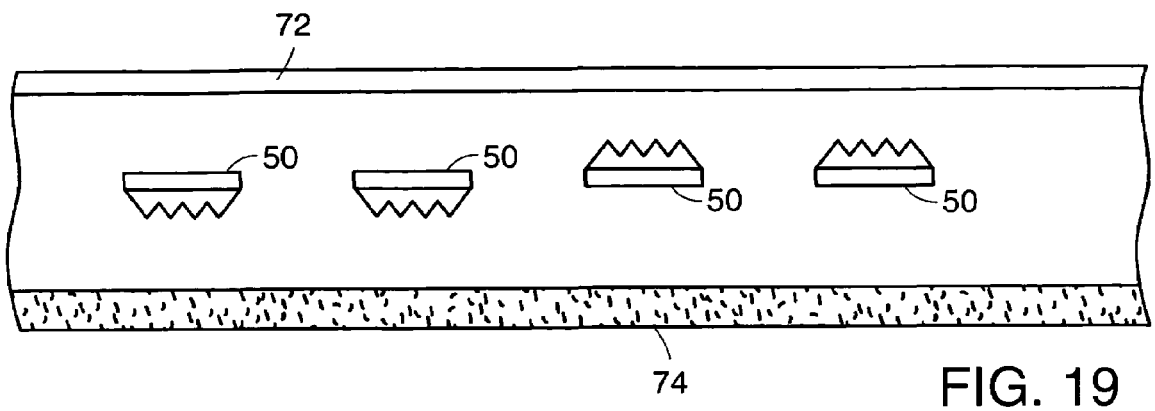
FIG. 19 is a side view of open-faced retroreflective chips dispersed in a film.

In an alternative embodiment illustrated in FIG. 19, a retroreflective film, formed of a material such as polyester, can be cut into very small pieces or chips 50 which have about six to ten 152.4 μm (0.006 inch) pitch prisms on each piece. The back side of chips 50 can have a color coating thereon. These pieces 50 are collected and can then be spread onto a white polyvinyl chloride or similar film using a spreading means such as a sifter which uniformly spreads the pieces on the film. As the pieces 50 are spread on the white PVC film, they can be sealed into the PVC film under heat and pressure with a lamination system which causes the film to flow around the retroreflective pieces forming a flat sheet. This sheet is then covered with a printable coating 72, such as DB40 printable coating, which can also be made translucent with titanium dioxide. Titanium dioxide provides ultraviolet protection to make the film more durable for outdoor use. A pressure sensitive adhesive (PSA) or heat activated adhesive (HAA) 74 can be applied to the back surface for bonding onto a substrate such as a tarpaulin or rigid surface. Examples of suitable PSAs include acrylic PSAs and suitable HAAs are urethane HAAs.

Figure 20:
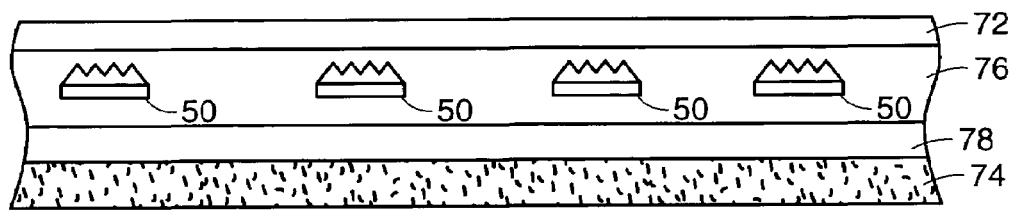
FIG. 20 is a side view of open-faced retroreflective chips dispersed in a PVC film.

Another embodiment, illustrated in FIG. 20, is to seat the polyester particles 50 in a PVC film 76 using a PVC film coating machine. The pieces can be spread onto a PVC film layer 78 which can be white and then a clear PVC plastisol 76 flowed onto the pieces and film 78 followed by the curing or fluxing the plastisol at high temperature. A printable coating 72 can be applied to the clear vinyl top film if desired after the clear vinyl plastisol is cured. The printable coating 72 can be translucent to improve whiteness and durability.

Figure 21:
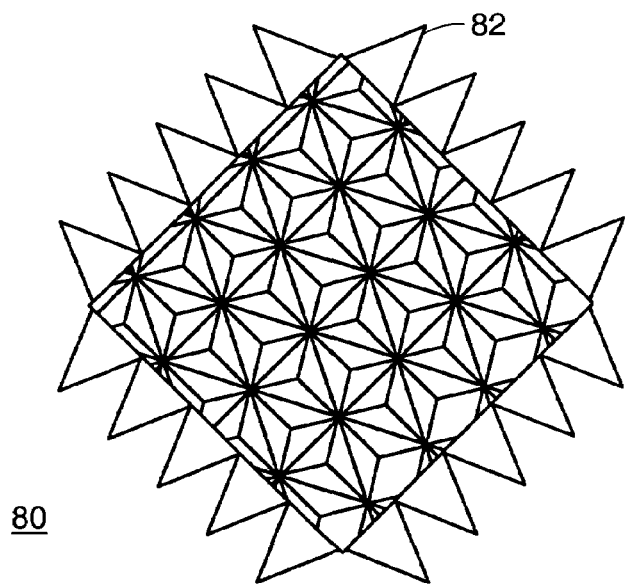
FIG. 21 is a plan view of an exemplary retroreflective chip design designed to grab or interlock with garment or fabric fibers.
Figure 22:
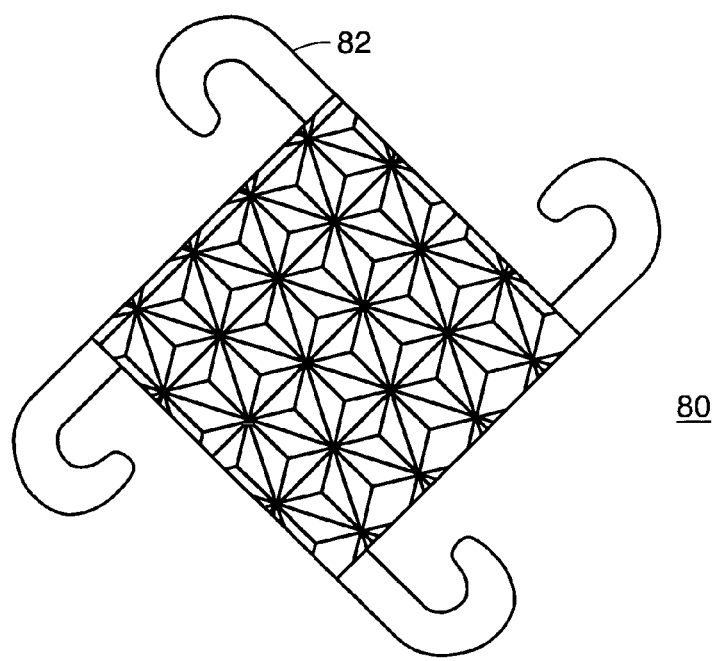
FIG. 22 is a plan view of an alternative retroreflective chip design designed to grab or interlock with garment or fabric fibers.

Retroreflective cube-corner film can be diced into particles of various sizes ranging from 25.4 μm (0.001 inches) on a side or diameter to about 0.635 centimeters (0.25 inches) or greater. Particles 80 of about 25.4 μm (0.001 inches) to 508 μm centimeters (0.02 inches) in average size are suitable for dispersing in binders that can be coated on fabrics are often substantial particles that are dispersed into binders and coated on fabrics can benefit from having edges 82 modified to be of a configuration which can mechanically grasp or snag the fabric fibers. Preferably, edges 82 include the cube-corner surfaces. Examples of some edge modified shapes are shown in FIGS. 21 and 22. Preferably, the shapes are cut from dies having complex designs such that essentially no material is wasted in the process.

Figure 23:
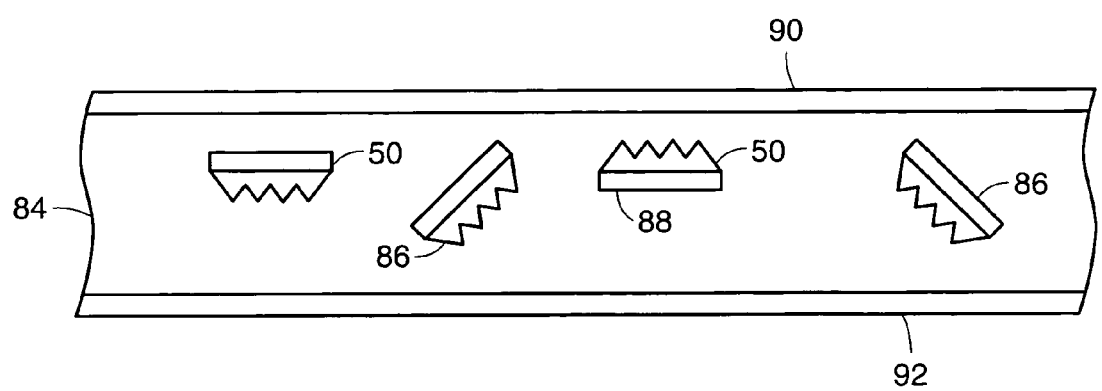
FIG. 23 is a side view of a projection screen employing retroreflective chips of the present invention.

An efficient projection screen can be formed utilizing cube-corner prism arrays if the reflecting surfaces of the corner cubes are textured and the front face of the top film is designed as a lenticular to optimize the direction of the reflected light distribution. Free prism clusters distributed in a film, such as polyvinyl chloride, work well. Wide web thermoplastic film 84 can be easily bonded to piece together very large screens. Prism clusters can be dispersed in a film or in a paint. The paint can be used to cover a wall in a design pattern. As seen in FIG. 23, prisms 86 tilted at an angle create smaller apertures and more diffraction scattering. Reflection can also occur from a backside 88 of prism clusters. Backside 88 of prisms can also be printed with a color to create a color appearance to the projection screen. Backside 88 can also have an optical microstructure design to spread light to the appropriate angles. Also, double side open-faced chips can be used for seamless retroreflective projection or imaging screens. Prisms can be aluminum metalized with complete reflection layer or flash coated to varying degrees to create improved scattering. A film 90, such as a clear, transparent thermoplastic film, can be positioned on the front side of the film. A backing film 92, such as a colored layer, can be applied to the back side of the film.

Various textures, various prism sizes, various prism carrier films such as different indices of refraction, various oligomer, various color on prism surfaces can be used to create many types of front projection screens that reflect the light of given angles and have various ambient light appearances. The same manufacturing concept can be used to manufacture many styles of retroreflective tapes, films or fabrics.

Figure 24:
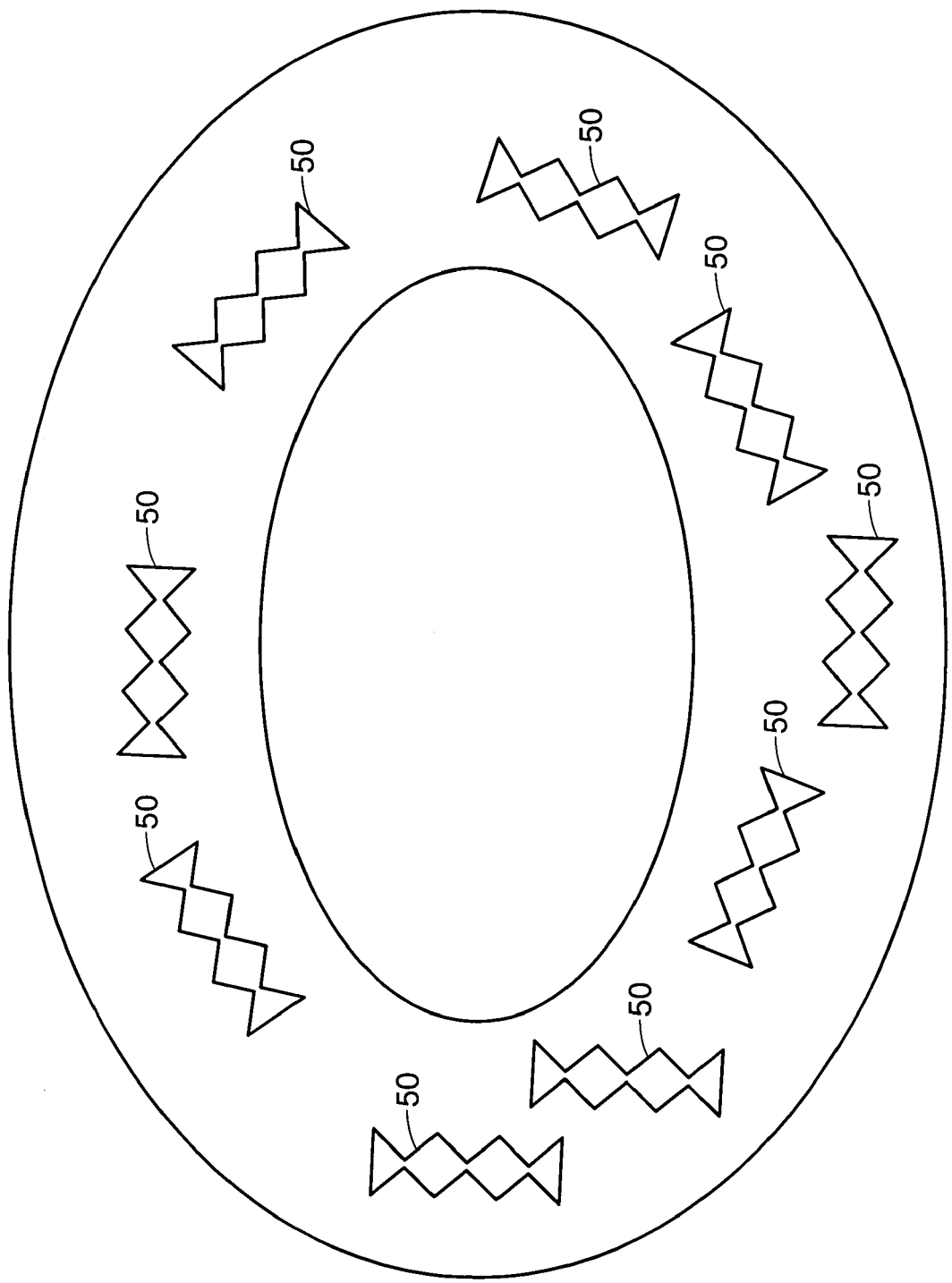
FIG. 24 is a cross-sectional view of an exemplary object employing retroreflective chips in accordance with the present invention.
Figure 25:
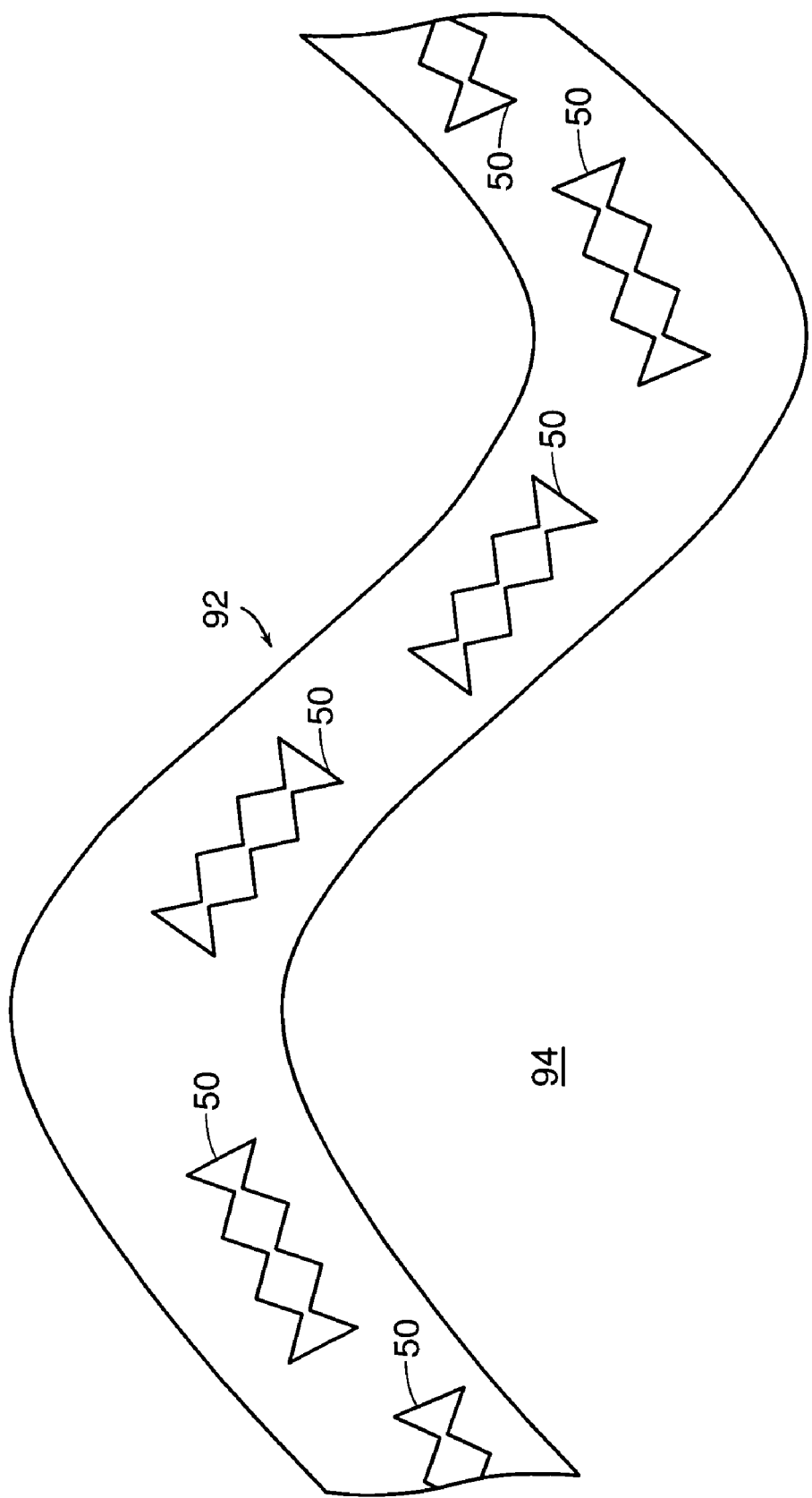
FIG. 25 is a cross-sectional view of a contoured object having retroreflective chips thereon in accordance with the present invention.

Diced chips 50 extruded into a clear thermoplastic or thermosetting polymer can be used to create many types of objects which retroreflect from all directions because of the light passing through the transparent polymer. A cross-sectional view of an exemplary object is illustrated in FIG. 24, which may be used as a roadside delineator. FIG. 25 illustrates the chips 50 which conform to the shape of a contoured object 94. Preferably, the viscosity of the substantially transparent polymer or resin 92 allows the chips 50 to lay down, or conform to the surface of the contoured object 94. In one embodiment, the chips 50 are mixed into the resin 92 and then sprayed onto the object 94.

The transparent plastic/polymer can be a transparent color. Extruded and molded shapes can be used for retroreflective objects such as delineator posts, bollards (also internally illuminated bollards), barricades, cones, channelizers, vehicle parts-bumpers, fenders, body outer shell parts, wheel rims, bicycle rider helmets, helmets of all types-pilots, boating, in-line skating wheels, photoelectric devices, road markers, guard rails, marine buoys, boat outershell parts, boat masts, and snow poles. Chips 50 can be mixed into transparent UV cured resins and coated onto a plastic substrate to create seamless uniform sheeting useful for many applications.

EXAMPLE 1

A structure of 50.8 µm (2 mil) pitch open-faced prisms was cast onto 50.8 µm (2 mil) polyester film with a UV curable epoxy-acrylate resin. The structure was coated with a thin film of vacuum deposited aluminum in order to produce the retroreflective surfaces. Samples were characterized as having a set of illumination angles (SIA), also known as entrance angles values, of over 300 candelas/lux/sq.m. at 0.2 observation and −4 entrance angles. A protective top coating of urethane-acrylate resin was coated on the face of the material and it was aged in an Atlas Xenon Weatherometer with the ASTM G26 cycle. The initial reading of 309 SIA dropped to 131 SIA after 4,000 hours in the weatherometer. The maintenance of over 40% of the initial reflective brightness is considered to be unusually good for this type of prism resin.

EXAMPLE 2

A structure of 50.8 µm (2 mil) pitch open-faced prisms was cast onto a polyester film with a UV curable epoxy-acrylate resin. The structured surface was vacuum coated with aluminum to produce a retroreflective material. A protective layer of acrylic film, VCF a-223, that had been coated with a thin adhesive layer of Rohm and Haas, Paraloid F-10, was thermally laminated to the retroreflective face at 121 degrees Celsius (250 degrees Fahrenheit) and 27.8 kPa (4 psi). The sample displayed a retroreflective value of over 300 SIA units at 0.2 degree observation and −4 degree entrance angle.

EXAMPLE 3

A structure of 50.8 µm (2 mil) pitch open-faced prisms was cast onto a polyester film carrier with a UV curable epoxy-acrylate resin. The structured surface was vapor coated with aluminum to produce a retroreflective material. The retroreflective face was then screen printed with a white acrylic caulking compound, DAP, and a layer of acrylic film was laminated to the printed pattern while it was still tacky. The sample displayed a retroreflective value of over 300 SIA units. A 25.4 µm (1 mil) polyester film that had been coated with 25.4 µm (1 mil) of acrylic pressure sensitive adhesive (PSA) on each side and covered with two layers of silicone coated polyester film was used as the carrier. Open-faced prism structures were sequentially cast onto the two PSA surfaces and the sample was aluminum metalized to produce a thin material that was 139.7 µm (5.5 mil) thick and had retroreflective elements on both sides.

EXAMPLE 4

An open-faced prism structure was cast onto polyester film and then aluminum coated to produce a retroreflective material. The material was chopped up into "chips" that were approximately 3 mm×3 mm (0.118 inches×0.118 inches). The chips were mixed with commercially available peroxide curing polyester resin and coated onto a fiberglass mat. Upon curing the fiberglass composite displayed retroreflection from the chips that were orientated with their faces to the front surface. The example provides for a simple means to produce durable retroreflect composite products, such as boats, recreational vehicles, etc.

EXAMPLE 5

Wire composed of 95% tin and 5% antimony, commonly sold as lead free solder, was pressed to about 55,000 kPa (8,000 psi) into the surface of an even generation nickel electroform which had been prepared from a corner cube master. As the wire was compressed it took on the open-faced prism structure from the electroform and became retroreflective. The operation was repeated six more times on the electroform without significant damage to the nickel tool or loss of retroreflective performance of the product. Laser diffraction patterns from the seven pieces were also very similar, indicating that the tool was not damaged from the multiple pressings. Some of the samples were coated with aluminum to further improve their reflectance and then a clear epoxy or UV cured urethane acrylate coating to protecting the surface.

EXAMPLE 6

Untempered aluminum foil and wire were compression molded into open-faced prism structures in the same manner as Example 5. The metal parts were strongly retroreflective at over 300 SIA without further processing. The metal parts retained their retroreflectivity even when heated in an oven at 93 degrees Celsius (200 degrees Fahrenheit) for a week. The material makes an excellent full spectrum (short wave UV to long wave IR) retroreflector.

EXAMPLE 7

A 91.44 µm (3.6 mil) open-faced prism structure was cast onto 50.8 µm (2 mil) polyester film with a UV curing acrylate resin. The structure was aluminum metalized and then coated with a fluorocarbon urethane coating composed of 30 g of GK 510, Daikin Chemical Corp., 6 g toluene, 6 g Takenate D 140N, Takeda Chemical Industries, Ltd., and 2 drops of 0.1% dibutyl tin dilaurate in toluene. The resulting sample displayed a retroreflective SIA value of over 900 at 0.2 degree observation and −4 degree entrance angle. Coatings such as this fluorocarbon urethane are well known to have long life (for example, over 10 years) outdoor durability.

While this invention has been particularly shown and described with references to preferred embodiments thereof, it will be understood by those skilled in the art that various changes in form and details may be made therein without departing from the scope of the invention encompassed by the appended claims.

What is claimed is:
1. Retroreflective sheeting, comprising:
 a) a plurality of first open-faced cube-corner surfaces formed from a substantially rigid material to keep the first cube-corner surfaces from flexing, the first cube-corner surfaces being disposed on a first side of a carrier substrate;
 b) a plurality of second open-faced cube-corner surfaces formed from the substantially rigid material to keep the second cube-corner surfaces from flexing, the second cube-corner surfaces being disposed on a second side of the carrier substrate; and c) an optical coating disposed on at least some of the first and second cube-corner surfaces, light incident on the optical coating being retroreflected without passing through the substantially rigid material.

2. The sheeting of claim 1, wherein the optical coating includes a specular coating.

3. The sheeting of claim 1, wherein the optical coating includes a low index of refraction dielectric material.

4. The sheeting of claim 3, wherein the index of refraction is in the range of between about 1.1 and 1.3.

5. The sheeting of claim 1, wherein the substantially rigid material is selected from a group consisting of thermoplastic and thermoset polymers.

6. The sheeting of claim 5, wherein the polymers further include a filler which is selected from a group consisting of glass, graphite, polymers, and metals.

7. The sheeting of claim 1, wherein a plurality of voids form the first and second open-faced cube-corner surfaces.

8. The sheeting of claim 7, wherein each void includes three surfaces which meet at a nadir.

9. The sheeting of claim 1, further comprising a color coating on at least some of the first and second open-faced cube-corner surfaces.

10. The sheeting of claim 1, wherein the sheeting is diced into chips and mixed into or placed on at least one or more of the following: a coating, a paint, a polymer, or an adhesive.

11. The sheeting of claim 10, further comprising a top coat covering the at least one of the coating, the paint, the polymer, or the adhesive.

12. The sheeting of claim 1, wherein the sheeting is breakable into chips.

13. The sheeting of claim 1, further comprising patterns on the retroreflective sheeting having no open-faced cube-corner surfaces.

14. The sheeting of claim 13, wherein the patterns form walls in the retroreflective sheeting that extend from the carrier substrate to a prism ridge, the thickness of the walls being in the range of between about 25.4 and 1,270 micrometers (0.001 and 0.05 inches).

15. A projection screen which includes the retroreflective sheeting of claim 1.

16. The sheeting of claim 1, wherein the substantially rigid material is colored.

17. Retroreflective sheeting, comprising:
a) a first plurality of three-sided indentations which form first open-faced cube-corners;
b) a second plurality of three-sided indentations which form second open-faced cube-corners opposing the first open-faced cube-corners; and
c) a reflective coating disposed on at least a portion of the first and second three-sided indentations for retroreflecting light that does not pass through the sheeting.

18. The sheeting of claim 17, further comprising a carrier sheet disposed between the first and second open-faced cube-corners.

19. The sheeting of claim 17, wherein the sheeting is diced into chips having a length less than about 457 micrometers.

20. The sheeting of claim 19, wherein the chips are disposed on or in an adhesive.

21. The sheeting of claim 19, wherein the chips are disposed on or in at least one of a coating, a paint, a polymer, or an adhesive.

22. The sheeting of claim 17, further comprising patterns in the retroreflective sheeting having no open-faced cube-corner surfaces.

23. Retroreflective chip, comprising:
a) a structure having a plurality of open-faced cube-corner surfaces formed therein, the structure having a length less than about 457 micrometers and the open-faced cube-corner surfaces are first open-faced cube-corner surfaces and the structure includes a plurality of second open-faced cube-corner surfaces which oppose the first open-faced cube-corner surfaces; and
b) a metal layer formed on the surfaces that retroreflects incident light thereon such that retroreflected light does not pass through the structure.

24. Retroreflective chips comprising first open-faced cube-corner surfaces having an optical coating thereon, the coating retroreflecting light incident thereon such that light does not pass through the chips and further comprising second open-faced cube-corner surfaces having specular coating thereon laminated to a back side of the first open-faced cube-corner surfaces such that the respective open-faced surfaces face away from each other, each chip having a length less than about 457 micrometers.

25. The retroreflective chips of claim 24, further comprising a color coating on at least some of the surfaces.

26. The retroreflective chips of claim 24, further comprising a fill layer attached to at least a portion of the optical coating, the fill layer having an index of refraction in the range of between about 1.5 and 1.65.

27. The retroreflective chips of claim 24, wherein the first open-faced cube-corner surfaces include different size surfaces on the chips.

* * * * *